United States Patent
Brueckheimer et al.

(10) Patent No.: US 6,519,261 B1
(45) Date of Patent: Feb. 11, 2003

(54) ASYNCHRONOUS TRANSFER MODE ADAPTATION ARRANGEMENTS

(75) Inventors: Simon Brueckheimer, London (GB); David John Stacey, Stansted Abbotts (GB); Fai Tsang, Chelmsford (GB); Martin Sproat, Stevenage (GB); Graham Fellows, Bengeo (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/346,323

(22) Filed: Jul. 2, 1999

(51) Int. Cl.[7] .......................... H04L 12/28; H04L 12/56
(52) U.S. Cl. .............................. 370/395.52; 370/395.64
(58) Field of Search ........................ 370/395.1, 395.5, 370/395.52, 395.6, 395.61, 395.63, 395.65, 465, 466, 469

(56) References Cited

U.S. PATENT DOCUMENTS

| | | | | |
|---|---|---|---|---|
| 5,699,369 A | * | 12/1997 | Guha | 714/774 |
| 6,061,820 A | * | 5/2000 | Nakakita et al. | 370/395.65 |
| 6,084,880 A | * | 7/2000 | Bailey et al. | 370/395.2 |
| 6,219,339 B1 | * | 4/2001 | Doshi et al. | 370/235 |
| 6,243,382 B1 | * | 6/2001 | O'Neill et al. | 370/395.52 |

* cited by examiner

Primary Examiner—David Vincent
(74) Attorney, Agent, or Firm—Lee, Mann, Smith, McWilliams, Sweeney & Ohlson

(57) ABSTRACT

An interface arrangement provides interworking between packet (IP), time division multiplex (TDM) and asynchronous (ATM) networks, and incorporates a TDM framer providing an interface to the TDM network, a packet framer providing an interface to the packet network, and ATM adaptation function providing an interface to the ATM network. The ATM adaptation function comprises a set or suite of integrated circuit devices, the devices being partitioned by AAL functions into a first device set arranged to perform a common part sublayer function and a second device set arranged to perform service specific sublayer functions. The composition and nature of the device sets can be chosen to match the traffic types and quality of service requirements.

12 Claims, 10 Drawing Sheets

ASYNCHRONOUS TRANSFER MODE ADAPTATION ARRANGEMENTS

This invention relates to telecommunications networks, and in particular to arrangements and methods for adapting traffic in such networks.

BACKGROUND OF THE INVENTION

Traditionally, two types of legacy telecommunication networks have been developed. The first type is connection oriented and is used for the transport of narrow band voice traffic, typically carried in TDM frames. Such networks comprise for example synchronous or plesiochronous networks. The second type of legacy network is connection less in nature and is used for the transport of broad band packet or cell-based data traffic. There is currently a drive towards unified networks which provide end to end transport for both voice and data services. However, as there is a well established voice network base, network operators are naturally reluctant to replace such legacy networks. This issue has been addressed by providing broad band (asynchronous) overlay networks which interface with the established TDM networks to provide a voice and data transport function. At the interface between the two networks, an interface function maps TDM frames into packets or ATM cells and vice-versa. ATM is of course just one example of a packet based network.

A particular problem with the introduction of ATM transport networks is that of interfacing or inter-working with existing legacy networks which can carry many different types of traffic including voice, data and IP (Internet protocol) traffic. These services are accommodated by different ATM adaptation layers and thus require different adaptation processors to perform the process. The adaptation process is generally known as a trunking function that provides an interface between an ATM network and a non-ATM network whereby the end-to-end ATM network users have no visibility of the presence of the interconnecting ATM network. Alternatively, this process can be a co-adaptation process generally known as an interworking function that provides an interface in the ATM domain to re-adapt the services between different ATM adaptation layers, for example AAL1 to AAL2 etc.

As discussed above, a number of standards define the various adaptation layers (AALs) that are used to adapt the traffic to the appropriate ATM format. In particular, the following adaptation layers are currently in use.

AAL0 is defined as having a forty eight byte traffic payload per VC and incorporates no sequence numbering or content protection. The payload is not structured. Typically, this adaptation layer is used for continuous bit rate services which do not need to be secured and as an internal transport mechanism for carrying telephony control/signalling (CAS) to a signalling engine to process the data in a pseudo-structured fashion of which the adaptation layer itself is unaware.

AAL1 has a forty six or forty seven byte traffic payload structure depending on whether it is of structured data transfer (SDT) or of unstructured data transfer (UDT) The first byte at the beginning of the payload sequence is used for sequence numbering and the second byte, if it is structured, is used as a pointer once in every modular eight cycle to signal the start of a data structure in the payload. This latter process is optional depending on the data structure being carried in the payload. The structured mode of operation within the ML (SDT, P-format) is such that one or many time division multiplex (TDM) channels are adapted together to form a constant bit rate stream of AAL1 SDT cells in every TDM frame period. As for the unstructured mode (UDT, non-P format) this adaptation is used for continuous bit rate services which do not have an explicit data structure within the AAL1 UDT cell streams. In this application, either single TDM telephony channels or multiples of such channels are organised on to a single connection, and it is left to the end-to-end termination points to frame/re-frame in order to recover these data channels.

The bit order in the AAL1 UDT non-P-format is still preserved but alignment of the internal byte structure of data may well precess against the ATM byte structure. For example, the standard. T1 unstructured format comprises one hundred and ninety three bits which will not divide exactly by eight to fit into the byte structure form of the ATM cell. This unstructured mode is typically used for circuit emulation services where the traffic source is not synchronised to the ATM network (nor necessarily the PSTN) but end to end synchronisation of the data rate through the ATM network is required. It is expected that the destination recovers the framing information form the emulated stream to recover the T1 data. In structured transport, the traffic is already byte oriented so that both bit and byte order are preserved between the source and destination ends of the connection. This mode is used for single 64 kbits circuits (or subrate services carried as 64 kbits services) or mutliples of 64 kbits such as 2 (ISDN Wideband), 6 (H0-multimedia wideband call), 24 (T1 but synchronous only the 192 traffic bits carried) and 30/31 (E1 synchronous. The frame alignment word TS is not transported end to end as the frame terminates at the input to the adaptation layer).

The structured transport method is not dynamic. The structured VC is set up for the duration of the call and broken down afterward but cannot be changed during the call AAL2 is defined as having a forty seven byte payload structure. The first byte in the payload structure is used for integrity checking, sequence numbering and cell delineation. The rest of the remaining bytes of the payload contains mini-packets (CPS packets) each with their own packet headers. AAL2 is usually used for delay sensitive variable bit rate services such as voice and image data services. For example either single 64 kbits telephony channels, subrate channels (<64 kbits such as ADPCM or channels with speech silence removal features) or multiples of such corresponding groups of channels can each be adapted into their corresponding mini-packets which are then multiplexed into a single virtual connection(VC). The VC in this case can be deemed a variable rate pipe as connections within the pipe can be resized dynamically, started and ended whilst the VC is continually active. The connections in this VC are mini-packet connections where each circuit is identified uniquely by the combination of the circuit identifier (CID) and the VC number which carries that CID mini-packet. Mini-packet connections are connections in their own right but to the standard ATM network this variable rate feature and easy path set-up/removal makes the VC carrying the mini-packet appear as a VC with variable width. There are secure message transfer mini-packet types available for messaging i.e. messages protected by a CRC header or a trailer.

AAL5 uses a full a forty eight byte payload structure available in an ATM cell, but he adaptation method does provide message integrity protection over a block of AAL5 cells that comprise a message block via the CRC-32 bytes residing within the message trailer itself. The services of an AAL5 connection are generally message based and hence a variable bit rate service rather than continuous bit rate, although continuous bit rate services are supported. AAL5 data (or voice) is protected by CRC characters at the end of each message. Generally, ML5 services have the lowest priority in the ATM switching network.

At present, adaptation of the above described typical traffic services to these various adaptation layers requires fully separate adaptation processing for each layer. This is expensive in terms of equipment, adaptability and ownership by the network administration due to the difficulty of forecasting the nature and volume of the particular services.

A further disadvantage of current adaptation circuits is the difficulty of providing a multiple adaptation layer capability that is scalable and embodies a large connection capacity in an integrated circuit single chip structure. The respective demands on silicon area of the common part sublayer and of the service specific convergence sublayers on a common monolithic substrate can place severe constraints on the total traffic handling capacity of the device.

SUMMARY OF THE INVENTION

An object of the invention is to minimise or to overcome the above disadvantages.

A further object of the invention is to provide an improved arrangement and method for typical ATM adaptation of communications traffic.

According to a first aspect of the invention there is provided an asynchronous transfer mode adaptation processor comprising a set or suite of integrated circuit devices and being partitioned by AAL functions into a first device or device set arranged to perform a common part sublayer function and a second device or device set arranged to perform service specific sublayer functions.

According to a further aspect of the invention, there is provided an interface arrangement for providing interworking between packet (IP), time division multiplex (TDM) and asynchronous (ATM) networks, the interface comprising TDM framing means providing an interface to the TDM network, packet framing means providing an interface to the packet network, and ATM adaptation means providing an interface to the ATM network, wherein said ATM adaptation means comprises a set or suite of integrated circuit devices and being partitioned by AAL functions into a first device or device set arranged to perform a common part sublayer function and a second device or device set arranged to perform service specific sublayer functions.

According to a further aspect of the invention, there is provided an interface arrangement for inter-working of traffic between a first TDM network, a second Internet Protocol (IP) network, and an ATM network, the interface comprising;

- a TDM framing circuit providing an interface to the TDM network;
- an IP packet framing circuit providing an interface to the IP network;
- an ATM adaptation processor providing an interface to the ATM network; and
- a codec providing a coupling between the TDM framing circuit, the IP packet framing circuit and the ATM adaptation processor;

wherein the interface arrangement is such that such that data traffic is passed, directly between the TDM framing circuit, the adaptation processor and the IP framing circuit, and voice traffic is passed indirectly between the TDM framing circuit, the adaptation processor and the IP framing circuit via the codec According to another aspect of the invention, there is provided a method of providing interworking between packet (IP), time division multiplex (TDM) and asynchronous (ATM) networks via an interface comprising TDM framing means providing an interface to the TDM network, packet framing means providing an interface to the packet network, and ATM adaptation means providing an interface to the ATM network, wherein said method comprises partitioning said adaptation means by AAL functions into a first device or device set arranged to perform a common part sublayer function and a second device or device set arranged to perform service specific sublayer functions.

By choosing the constituent devices or chips based on the service demands and the network capacities, the chip-suite can be configured to support large scalable connections of Adaptation Layer's AAL-0, AAL-1, AAL-2 and AAL-5 for voice/data/messages, in the ATM trunking, interworking or AAL-2 switching system applications. The arrangement provides a functional partitioning of devices that can be optimised for variable and fixed packet adaptation layers having a high degree of flexibility in isolation or in combination to serve trunking, interworking, and switching of the said adaptation layers. Further, the functional partitioning can be optimised to provide significant scalability.

The functional partitioning of devices facilitates separation of concerns for traffic management, Quality of Service (QoS) controls, buffer depth scaling and low latency, and provides for integration and interworking of ML based and IP based traffic.

Large connection capacity can be accommodated such that a large AAL-2 adaptation layer switch, carrying precompressed voice and clear data CPS Packets via the wide-bandwidth (such as OC-12 or similar) ATM switch network interfaces, can be constructed by simply re-using the necessary constituent chips of the chip suite. Key AAL-2 specific SSCS's SDU processing functions (e.g. UUI termination, rate profiling, PDV dejitter and plesiochronous compensation) are advantageously supported within the chip suite to minimise external digital signal processor (DSP) or uP MIP requirements. For large connection capacity such as 8K or more this external MIP minimisation is significant.

Other standard transport media such as Frame-Relay or T*/E* can be used instead of ATM for the network interface as long as it has the capability and link bandwidth to transport encapsulated ATM cells for the required traffic and control information.

By choosing constituent chips based on the service demands and the network capacities, the chip-suite can be configured to support large scalable connections of Adaptation Layer's AAL-0, AAL-1, AAL-2 and AAL-5 for voice/data/messages, in the ATM trunking, interworking or AAL-2 switching system applications.

BRIEF DESCRIPTION OF THE DRAWINGS

An embodiment of the invention will now be described with reference to the accompanying drawings in which.

DESCRIPTION OF PREFERRED EMBODIMENT

Figure 1:
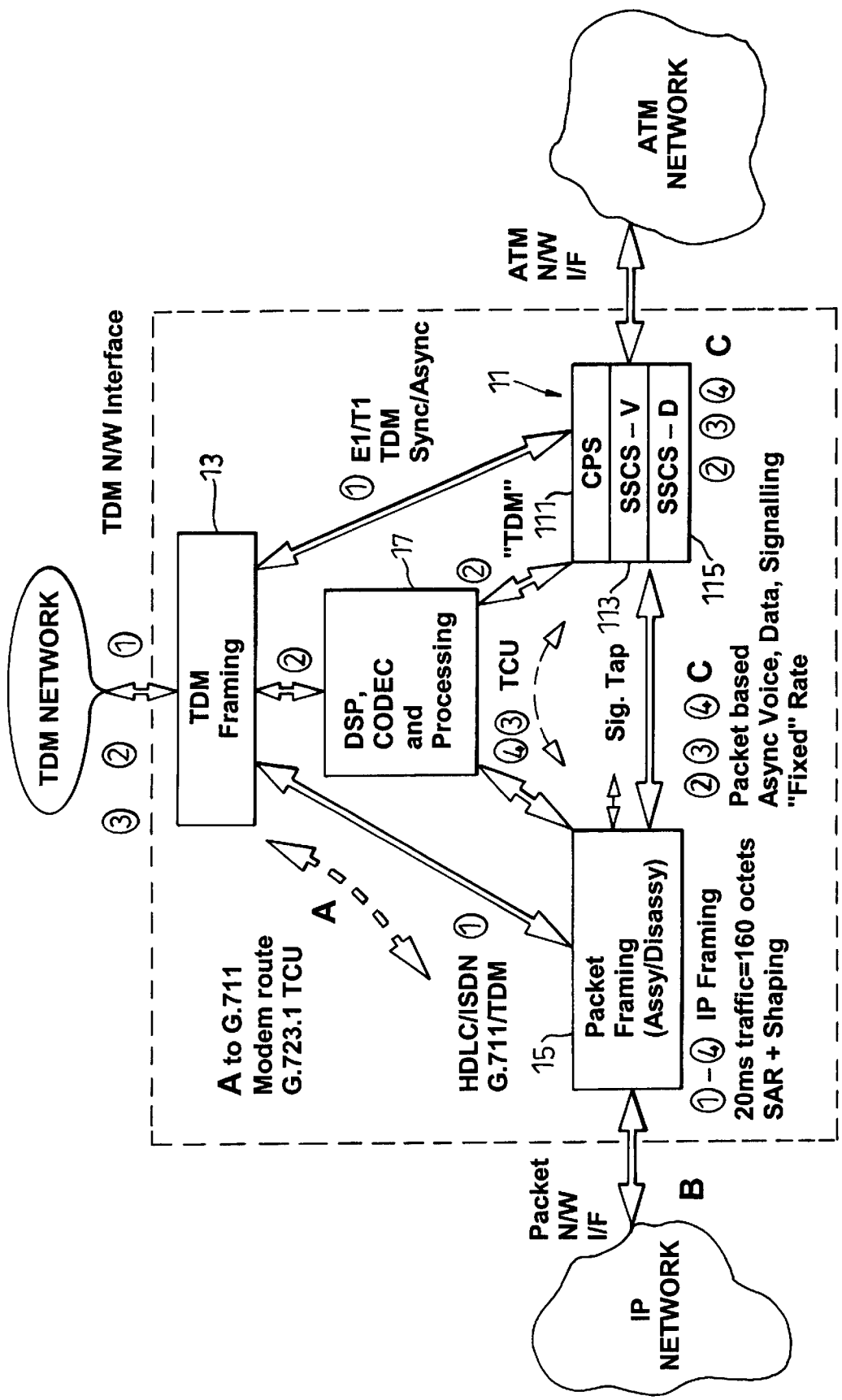
FIG. 1 is a schematic diagram of an arrangement for adaptation of communications traffic into selected ATM formats.

Referring first to FIG. 1, this depicts in schematic or generic form an arrangement or interworking function for adaptation of communications traffic into selected ATM formats. The arrangement, which is shown by way of example, accommodates both TDM based traffic and IP based traffic and is thus capable of providing an interface between three types of network. As shown in the figure, the interworking arrangement 10 comprises an ATM adaptation processor, generally depicted as 11, a TDM framing circuit 13, an IP packet framing circuit 15 and a codec 17. The adaptation processor 11, incorporates and is partitioned into a common part sublayer (CPS) device 111, a voice service specific convergence sublayer device (SSCS-V) 113, and an optional data service specific convergence sublayer device (SSCS-D) 115. The common part sublayer device, which may comprise a single circuit or a number of similar circuits, is common to all applications within its specified capacity, but the relative numbers of voice service specific convergence sublayer devices and data service specific convergence sublayer devices required will be determined by the user's service needs and the type of service adaptation equipment to be produced from e.g. interworking/trunking/switching equipment. This provides significant flexibility in adapting any existing service to any one of the above described adaptation layers. Further, by removing the requirement for integration of the service specific convergence sublayers with the common part sublayer, the silicon area thus made available for the latter can be fully exploited to provide enlarged connection capacity.

In the arrangement of FIG. 1, the adaptation processor comprises an integrated circuit chip set or suite comprising one or more common part sublayer chips and one or more service specific convergence sublayer chips. The various arrangements and inter-relationship of these chips forming the chip suite and typical modes of operation will be described below.

The arrangement is such that traffic may pass, as appropriate, directly between the TDM framing circuit 13, the adaptation processor 11 and the IP framing circuit for data only services. Otherwise, traffic is passed via the codec 17 for further voice/data processing as necessary. In the figure, the reference numerals 1, 2 3 and 4 denote paths for traffic types and typical adaptation layers as detailed in Table 1 below.

TABLE 1

| Path | Traffic |
| --- | --- |
| 1 | AAL1 UDT/SDT-CES |
| 2 | AAL2 SCA 16 kbit/s with embedded signalling + AAL1 SCA for clear channels |
| 3 | AAL2 SCA sub rate voice + AAL2/5 signalling |
| 4 | AAL5 VToD G.711 |
| A | Modem route-G.723.1 transcoded to G.711 |
| B | Frame Relay Route |
| C | AAL5 route to SSCS-D |

In the interworking function of FIG. 1, channel associated signalling (CAS) or common channel signalling (CCS) may be employed. In its simplest terms, channel associated signalling is a per bit circuit stream carrying a representation of the state of the appropriate call party's line. In practice, these bit streams are aggregated into multiplexes and intermixed into the voice bearer directly in the voice time slot data (e.g. T1) or as separate channels. Common channel signalling involves a dedicated telephony channel being reserved for carrying a bit stream based message service carrying call connection etc. messaging.

The chip set or suite of FIG. 1 supports trunking, interworking and AAL-2 switching. Within each mode of operation the chip suite can be configured in various ways to increase system flexibility and scalability. Examples of typical modes of operation are described below.

The CPS (Common Part Sublayer) device will support e.g. an OC12 capable ATM interface and a maximum of e.g. 8064 connections. The SSCS (Service Specific Convergence Sublayer) device will either match this capacity or be half the CPS size, and thus support a dual-OC3 and up to 4032 connections. Generally in this section the term capacity is used to describe the combination of both the physical bandwidth capacity of a device and its maximum number of connections.

Trunking

In trunking mode the chip suite is used to perform the function of adaptation between the narrow band domain (via synchronous TDM domain or a synchronous/asynchronous packet interface) and the broadband domain (supporting ATM adaptation layers 0, 1, 2 and 5).

Three configurations are possible, these being single SSCS/single CPS, multiple SSCS/single CPS, and multiple SSCS/multiple CPS.

Single SSCS/Single CPS Trunking Mode

Figure 2:
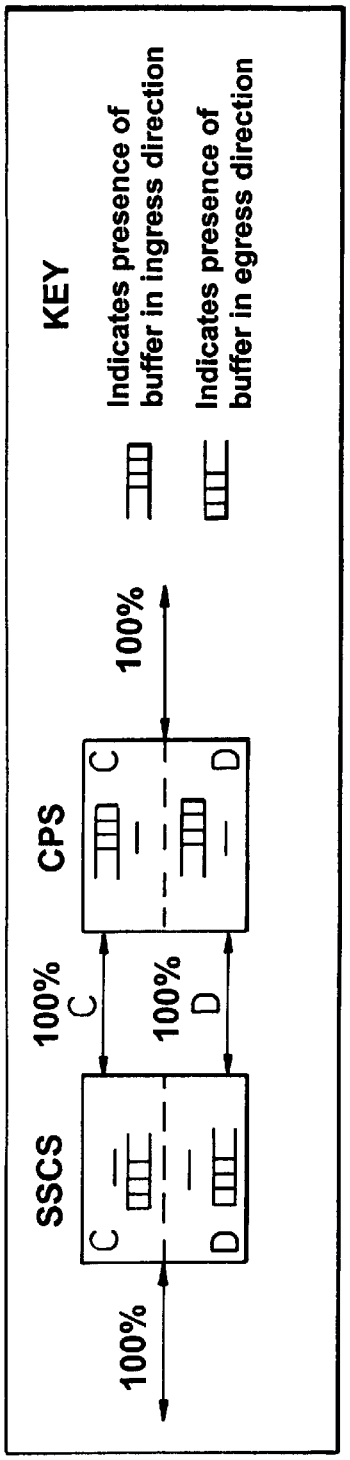
FIG. 2 illustrates a partitioning of the adaptation processor employed in the arrangement of FIG. 1.

The simplest trunking sub-system which is shown schematically in FIG. 2 consists of a single SSCS device connected to a single CPS device. The diagram illustrates the basic interconnection between the two devices; the capacity of the devices and serial links (both connections and bandwidth); and the presence (or absence) of control and data buffers in egress and ingress directions on the two devices. Note that although in the diagram separate logical control (C) and data (D) serial links are illustrated, this does not of course preclude their physical implementation as a single link.

When performing the trunking function in the ingress direction (TDM to ATM) the SSCS voice device acts in flow through transmitting partial SSCS SDUs immediately to the CPS device as soon as possible, either as soon as an encoded data unit (EDU) is received from the SSCS packet interface or once sufficient octets are received over the TDM interface to constitute the minimum size SDU fragment. All SDU storage is therefore provided in the ingress CPS device which must be capable of absorbing the maximum instantaneous transfer rate over the serial links. In the egress direction the CPS acts as a flow-through device instantaneously routing CPS SDUs (and partial SDUs for AAL2) as soon as they are terminated at the ATM layer. The SSCS device therefore contains all of the buffering in the egress direction.

In the trunking configuration illustrated in FIG. 2, the usable capacity (connections and bandwidth) of both devices are matched (illustrated as 100% in the diagram). Clearly this capacity must also be supported by the interconnecting serial links. Therefore if both devices (SSCS and CPS) are implemented to support e.g. 8064 connections maximum, then this sub-system could be used to provide 64 kb/s voice trunking for a full OC12c of traffic capacity (i.e. supports OC12c physical ports on both its TDM and ATM sides). When supporting compressed voice using AAL2, the physical capacity will drop. Taking 16 kb/s ADPCM as an example of the kind of service supported, then the maximum 8064 channel capacity of the sub-system equates approximately to 190 Mb/s of ATM data. These port capacity limits are obviously halved for both devices if the SSCS voice is implemented as a 4032 connection device, i.e. 2×OC-3s.

Figure 3:
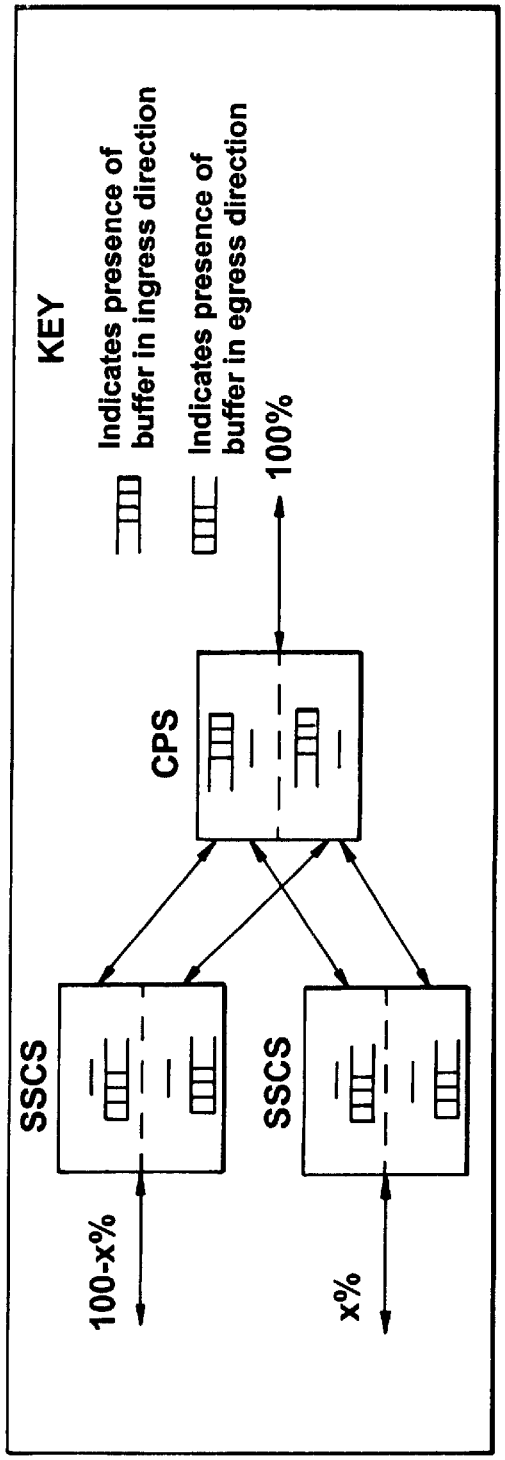
FIGS. 3 to 5 illustrate further partitioning arrangements.

To increase the trunking capacity (for example when using a 4Kconnection SSCS device) or to enable the sub-system to support more than 1 SSCS function, a second SSCS device can be interconnected to the same CPS device, this arrangement being illustrated in FIG. 3. The need to terminate more than one SSCS function on a single CPS is necessary for AAL2 where a single VC can simultaneously support both voice and data services; as for AAL, 01 and 5 separate VCs are always used per ATM connection and therefore two SSCS devices may always be used, one terminating VCs with delay-sensitive voice services (and thus interconnected to a SSCS-Voice device) and one terminating VCs with non delay-sensitive data services (and thus interconnected to a SSCS-Data device/function).

The configuration of a single CPS/multiple SSCS sub-system is illustrated in FIG. 3. This configuration shows two SSCS devices whose overall usable capacity is matched to the total capacity of the CPS device (shown as 100%). Thus the mean capacity of the two SSCS devices are 100-x % and x % respectively. By using a common memory payload structure and dynamic addressing within the CPS device any range of loading on the SSCS devices is possible, provided of course that the mean capacity of either SSCS device is not exceeded. Although the mean rate of each SSCS device must be within its limits the instantaneous rate transmitted to it can be equal to the maximum instantaneous port rate of the CPS device (i.e. the egress CPS can receive a burst of SDUs destined to one of the SSCS devices). In addition, in the ingress direction it is also possible that the two SSCS devices transit simultaneous bursts of data to the CPS device. Thus the architecture of the SSCS and CPS devices is designed to enable them to absorb an instantaneous rate equal to the sum of the maximum rates of all interconnected serial links, and the CPS device are designed to be able to absorb the maximum instantaneous rate of the sum of all interconnecting serial links.

Figure 4:
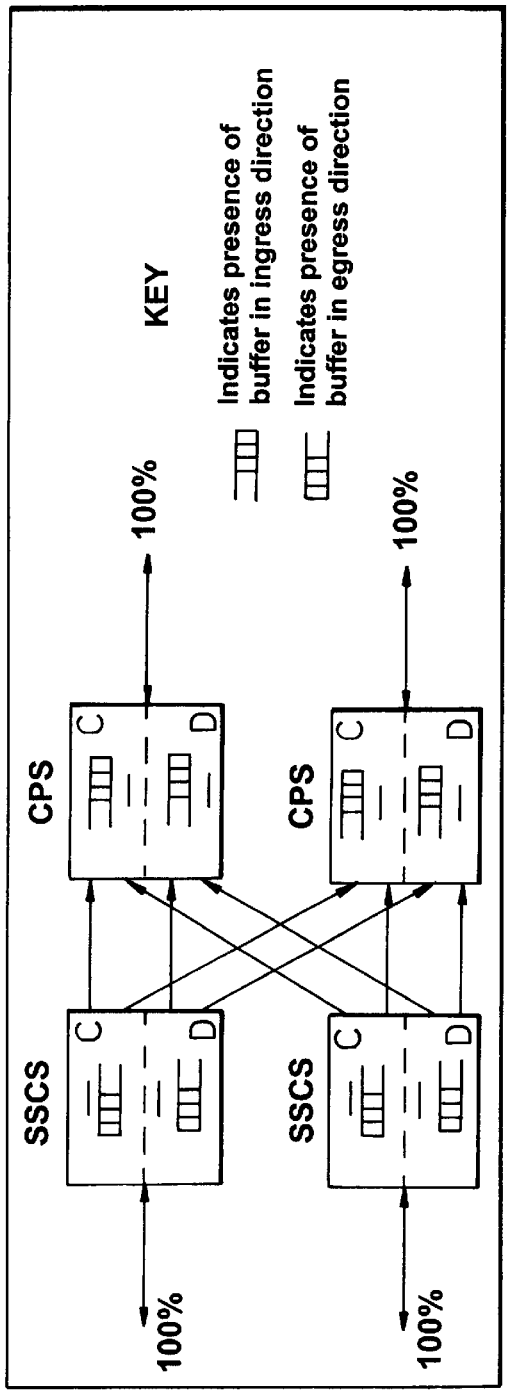

A further configuration illustrated in FIG. 4 uses two CPS devices and two SSCS devices. This is a preferred configuration if the capacity of the devices can be matched (8K connections) as, for ML2 applications, it enables an efficient 16K connection sub-system to be built that supports both voice and data.

This mode provides interworking functionality between different adaptation layers and/or voice coding standards (for example from 64 kb/s PCM carried over AAL1 SDT to 16 kb/s ADPCM carried over AAL2). The three basic configurations used in the trunking mode can also be used for interworking. However now the output of an SSCS device is 'looped back' to another SSCS device through the packet interface (via an optional digital signal processing (DSP) farm to allow transcoding between differing voice services).

AAL-2 Switching Mode

This mode of operation provides AAL2 adaptation layer switching (ALS) capability, i.e. the ability to switch an AAL2 mini-channel connection from one ATM VC to another. Clearly there is no concept of AAL 0/1/5 support in this mode. The AAL2 switching function is implemented entirely by the CPS device. the SSCS voice device is not used for switching except limited connection management data service may still be needed which either be a SSCS-Data device or an equivalent data handling function. The ALS sub-system is configured by the direct interconnection of a number of CPS devices. The size of an ALS system can be almost indefinitely scaled by cascading together ALS subsystems through an intermediate stage of ATM switching. The following section describes these two configurations in further detail.

ALS Sub-system

Figure 5:
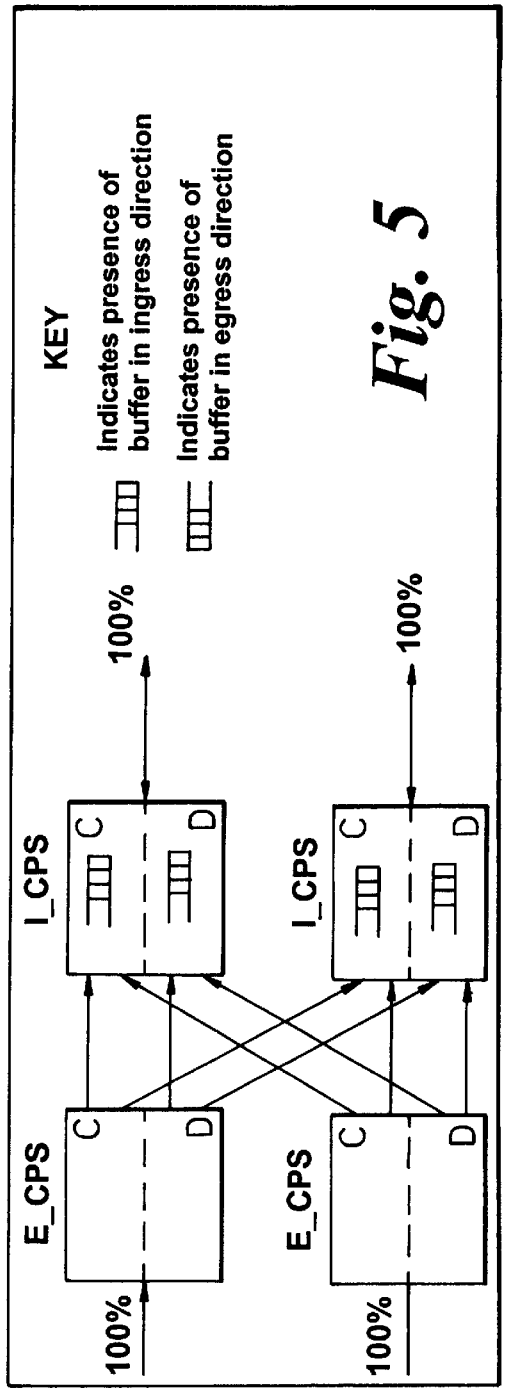

An ALS sub-system is configured by interconnecting CPS devices via their serial links to form a full mesh. This is illustrated in FIG. 5. As shown in FIG. 5, incoming VCs are terminated at the egress CPS (which again acts in a flow through mode) and the received AAL2 CPS packets (and partial packets) are routed to the ingress CPS according to the destination VC. Again for configurations where each SSCS/CPS device terminates a separate physical interface, the instantaneous traffic load to a single ingress CPS device can be equal to the sum of the maximum rate of the interconnected serial links. The ingress CPS can absorb this full rate, and queues the received packets into per destination VC queues. Completed ATM cells are then scheduled and dispatched onto the ATM port interface.

Typically, a single CPS device can switch up to 8K bidirectional mini-channel connections and taking 16 kb/s ADPCM as example will typically terminate approximately 190 Mb/s of ATM port data. Thus a subsystem configured with 4 CPS devices can terminate 32K bidirectional connections (approximately 760 Mb/s) maximum and can thus comfortably sustain a full OC12 ATM port.

Fragmentation and Connection Control

Multiple CPS devices are typically used to configure an ALS sub-system. As with many systems that are built from a number of smaller devices there is potential for fragmentation to occur when compared to an equivalent sized system built from a single component. If fragmentation occurs then the capacity of a single device can exceeded even when the overall system capacity is within limits. Thus a new connection may be blocked. However, providing an intelligent connection control (CC) mechanism is used for the ALS, then the potential for fragmentation to occur can be minimised.

An AAL2 VC consumes two elements of the CPS capacity namely physical bandwidth and a number of connections (one per AAL2 packet connection). The CC algorithm must attempt to balance the needs of these two parameters when establishing new VCs on the ALS—the aim is to avoid exhausting the number of connections set up on the device when there is little bandwidth used and vice-versa. Thus ideally the traffic contract for an AAL2 VC should define both the maximum bandwidth and connection demands of the VC. The CC algorithm will use these two parameters together with the current loading on each device to assign new VCs to a particular CPS. In this manner it is possible to achieve a good load balance across all devices within an AAL2 subsystem.

Multi-CPS ALS Systems

Figure 6:
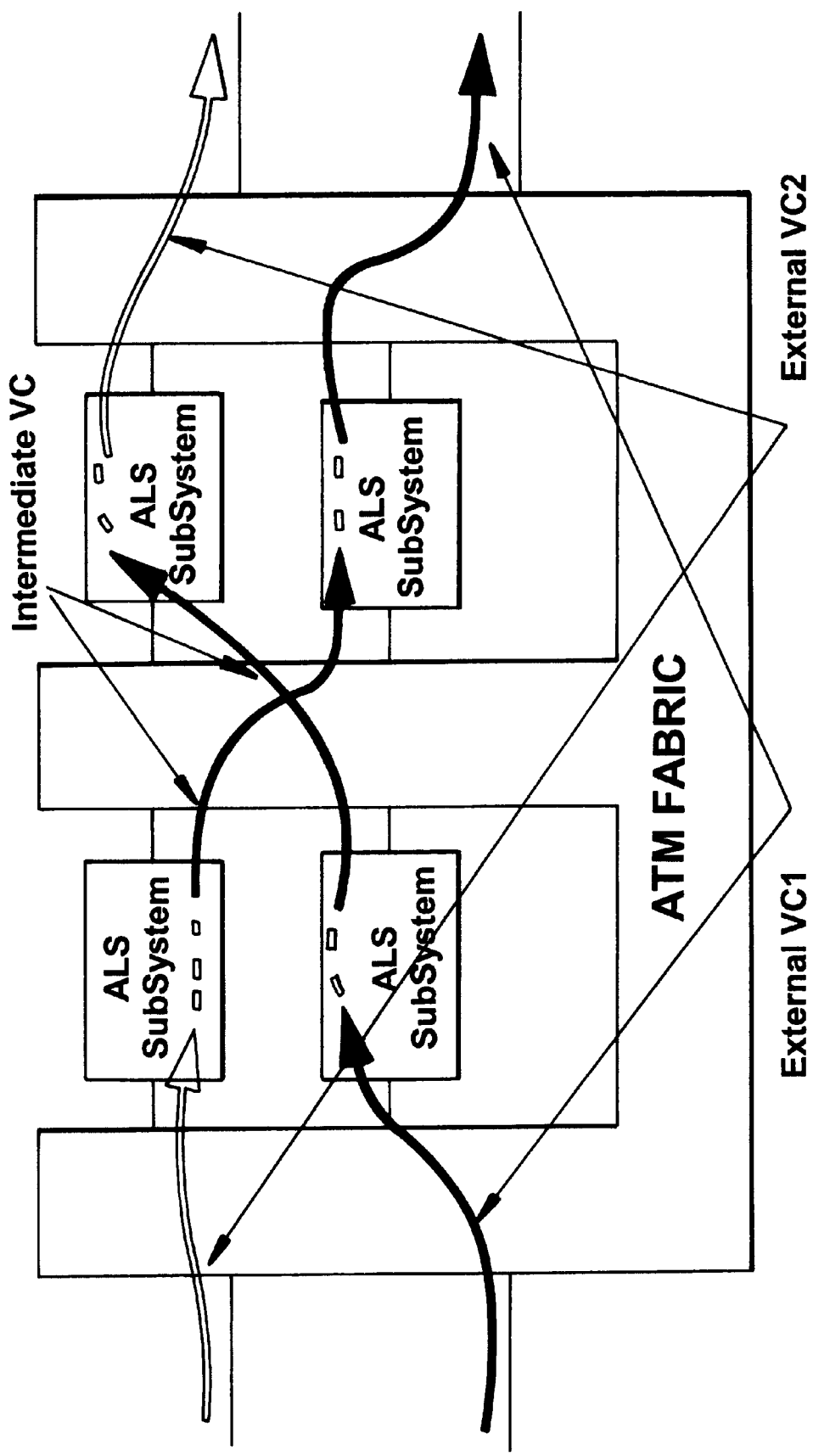
FIG. 6 illustrates a large capacity ALS switch.

To increase the ALS capacity above that of a single sub-system then multiple sub-systems can be configured together through the addition of an intermediate stage of ATM switching. The switching function is now implemented in two stages and this concept is illustrated in FIG. 6. Note also that a single physical ALS sub-system can be used to implement the two logical stages of the switching process. The first ALS sub-system is used to terminate the incoming VC. Received packets are now routed to the second sub-system stage via an intermediate VC. The second switching stage terminates the intermediate VCs and routes the received packets to the final destination VC.

For full connectivity there needs to be a full mesh of intermediate VCs between each ALS subsystem. The total number of intermediate VCs between any two subsystems will be dependent on their current community of interest. The ATM fabric is used to route the VCs (both external and intermediate) between the subsystems and provides a level of indirection between physical port and source and destination ALS subsystem (i.e. when establishing a new VC an arbitrary decision can be made as to which sub-system should terminate it).

To establish a new VC the ALS CC now makes a decision as to which sub-system (and within that which CPS device) to terminate it on. Again CC should attempt to load balance the VCs across the system to minimise the potential for internal blocking. At the packet level, to establish a new connection the ALS CC function will first establish that the new connection can be accommodated within the traffic parameters of the two external VCs. If it can then, the CC function then sets up a new AAL2 connection between source and destination ALS subsystem via an intermediate VC. The probability that the internal connection can be set up should be high to minimise internal blocking. In addition to load balancing, the internal blocking can also be minimised through the use of dilation, both in terms of ATM fabric and CPS device capacity, and the use of dynamic intermediate VC connection management.

Dynamic intermediate VC connection management refers to the process of dynamically altering the number of intermediate VCs between any two ALS subsystems according to changes in the community of interest between them. This avoids the potential for fragmentation whereby internal capacity is wasted due to the need to pad a large number of sparsely populated AAL2 intermediate VCs in order to minimise delay through the ALS. Thus as the community of interest changes intermediate VCs may be added or deleted. Clearly to delete an intermediate VC then all of its AAL2 mini-cell connections must also be deleted. For switched AAL2 packet connections this can be achieved simply by marking the VC for deletion and waiting for all of its connections to tear-down.

Inherently the ALS capacity can be scaled by adding additional sub-systems and/or additional stages of intermediate switching—in this manner an almost indefinite scaling of capacity can be achieved.

Application/Service-Layer

The function of this layer depends on the required system applications/services to be supported for a given network environment. However, it is envisaged that these necessary functions will be logically supported by suitable external functional devices/modules, which will be interacting logically with the SSCS Functions (DataNoice) of the chip suite via suitable TDM/packet interfaces. One possible application example is that the CODEC/voice-chip function can support per voice/tone circuit processing such as:

Compression/Decompression to given network provisioned voice algorithm for bandwidth and congestion management in AAL-2.

Speech-Activity-Detection (SAD) and generation/termination of SID in AAL-2 connections.

Echo-Cancellation (ECAN) to a given network provisioned voice algorithm.

Tone detection for signalling if necessary.

Or with a framer's packet interface to support asynchronous traffic disassembly and re-assembly.

Adaptation Layer Functional Partitioning for the Chip Suite:

The functional partitioning of the chip suite separates optimally the key traffic concerns and their interactions between the CPS and the SSCS sub-processing functions. This chip suite partitioning advantage is used to organise an AAL-2 adaptation layer switching resource module which is capable of relaying/switching CPS Packets received from any pre-provisioned AAL-2 VCCs. In the egress CPS function it segregates and switches the valid CPS Packets received from the egress AAL-2 VCCs, according to the connection management information provisioned, to any corresponding ingress AAL-2 VCCs supported in either the same or other physically collocated CPS functions. There is generally no requirement for voice SSCS function in this AAL-2 adaptation layer switching, except for limited data SSCS functions such as to terminate the AAL-2 specific ANP control messages, and F6 OAMs as necessary.

Egress Direction:

Compressed VP/NCI translations, with reference to packet CIDs, to corresponding local channel-ID (LCID) values for CPS packet switching/data packet routing.

Segregation of control data packets (Type 3/4 for ANP Messages, F6 OAM data packets) from normal voice packets for routing to/termination by the data SSCS function.

Supports the necessary OAM Management Functions (To be defined/agreed in details in relevant Sections): E. G. Fault Management, Performance Management, and Activation/Deactivation Management. In addition:

CPS PDU sequence check and lost CPS PDU detection.
Straddled partial CPS SDU reassemble.
CPS Packet delineations, HEC checks and maximum Length checks. Padding strip. Error handling and performance statistics as per MIB definition.

Ingress Direction

Translation of Egress Local Channel-IDs (LCID) to the corresponding compressed Ingress ATM VPINCI values, Packet CIDs and Outgoing VC Queue priority. Determination of per Outgoing VC Queue, either High or Low, from the Ingress CPS Packet.

For full connectivity there needs to be a full mesh of intermediate VCs between each ALS subsystem. The total number of intermediate VCs between any two subsystems will be dependent on their current community of interest. The ATM fabric is used to route the VCs (both external and intermediate) between the subsystems and provides a level of indirection between physical port and source and destination ALS subsystem (i.e. when establishing a new VC an arbitrary decision can be made as to which sub-system should terminate it). To establish a new VC the ALS CC now makes a decision as to which sub-system (and within that which CPS device) to terminate it on. Again CC should attempt to load balance the VCs across the system to minimise the potential for internal blocking. At the packet level, to establish a new connection the ALS CC function will first establish that the new connection can be accommodated within the traffic parameters of the two external VCs. If it can, then the CC function must then set up a new AAL2 connection between source and destination ALS subsystem via an intermediate VC. The probability that the internal connection can be set up should be high to minimise internal blocking. In addition to load balancing, the internal blocking can also be minimised through the use of dilation (both in terms of ATM fabric and CPS device capacity) and the use of dynamic intermediate VC connection management.

Dynamic intermediate VC connection management refers to the process of dynamically altering the number of intermediate VCs between any two ALS subsystems according to changes in the community of interest between them. This avoids the potential for fragmentation whereby internal capacity is wasted due to the need to pad a large number of sparsely populated AAL2 intermediate VCs in order to minimise delay through the ALS. Thus as the community of interest changes intermediate VCs may be added or deleted. Clearly to delete an intermediate VC then all of its AAL2 mini-cell connections must also be deleted. For switched AAL2 packet connections this can be achieved simply by marking the VC for deletion and waiting for all of its connections to tear-down. Inherently the ALS capacity can be scaled by adding additional sub-systems and/or additional stages of intermediate switching. In this manner a large scaling of capacity can be achieved.

Buffer Distributions and Organisations:

The traffic buffer distributions in the chip suite for cell-delay-variation (CDV) or packet-delay-variation (PDV) compensations are architectured to optimize for minimum delays, centralized pseudo static-buffering for simplicity and flexibility, and upgradability. This buffering organisation ensures that the chip suite will be extremely flexible when operated in the trunking, interworking, or AAL-2 switching mode already described.

Buffer Distributions in Trunking/Interworking Mode.

Figure 7A:
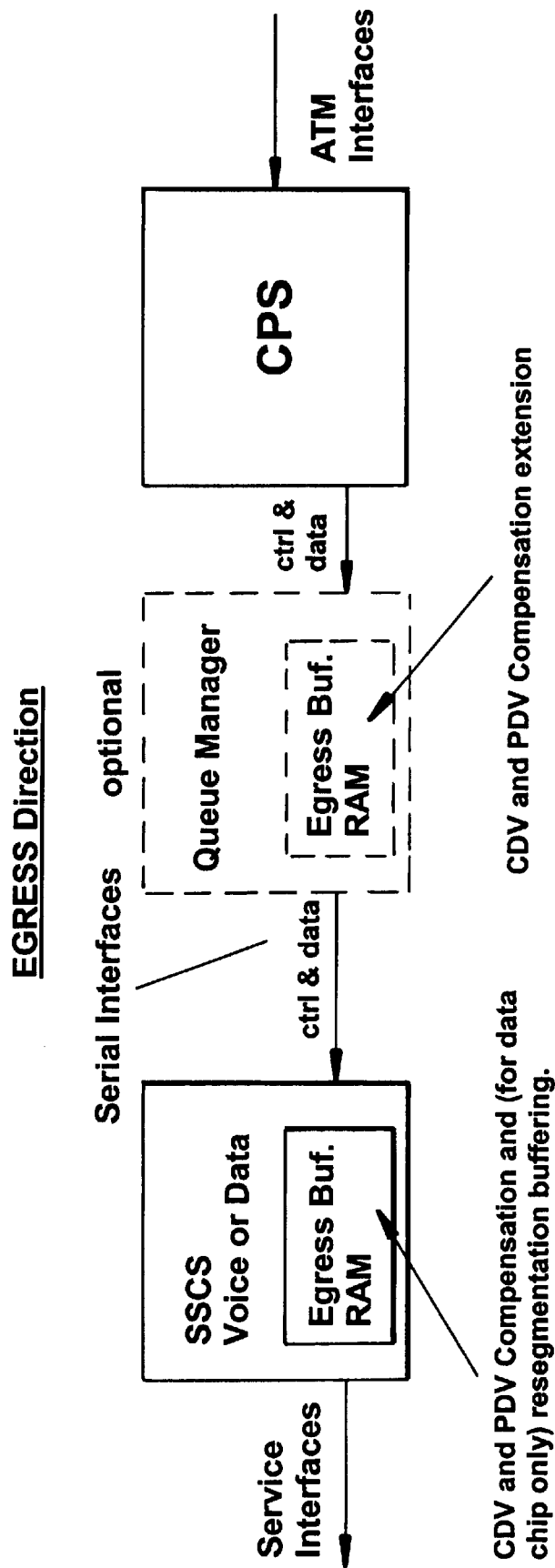
FIGS. 7a and 7b illustrate traffic buffer distribution for trunking/interworking for egress and ingress traffic respectively.
Figure 7B:
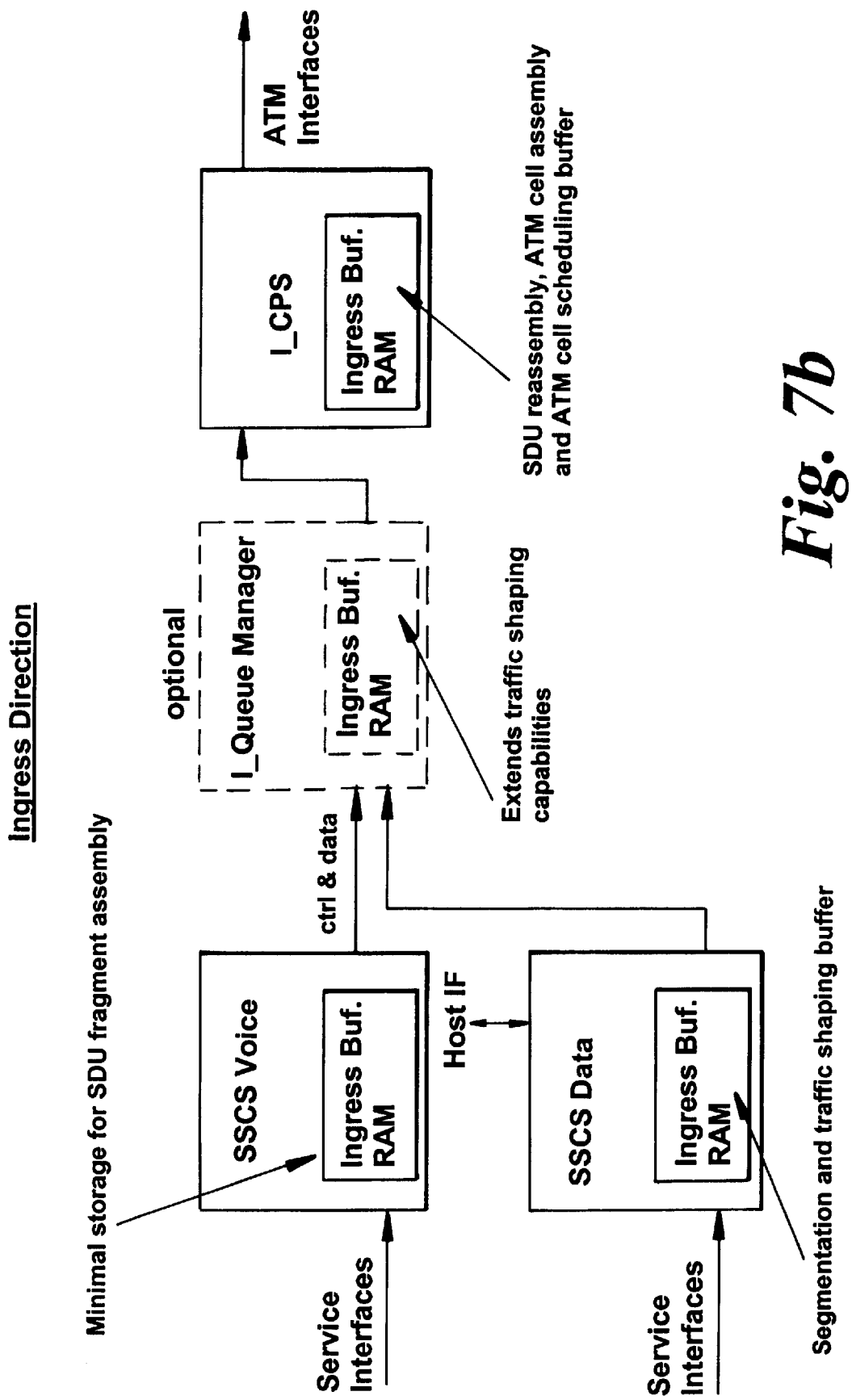
Figure 8:
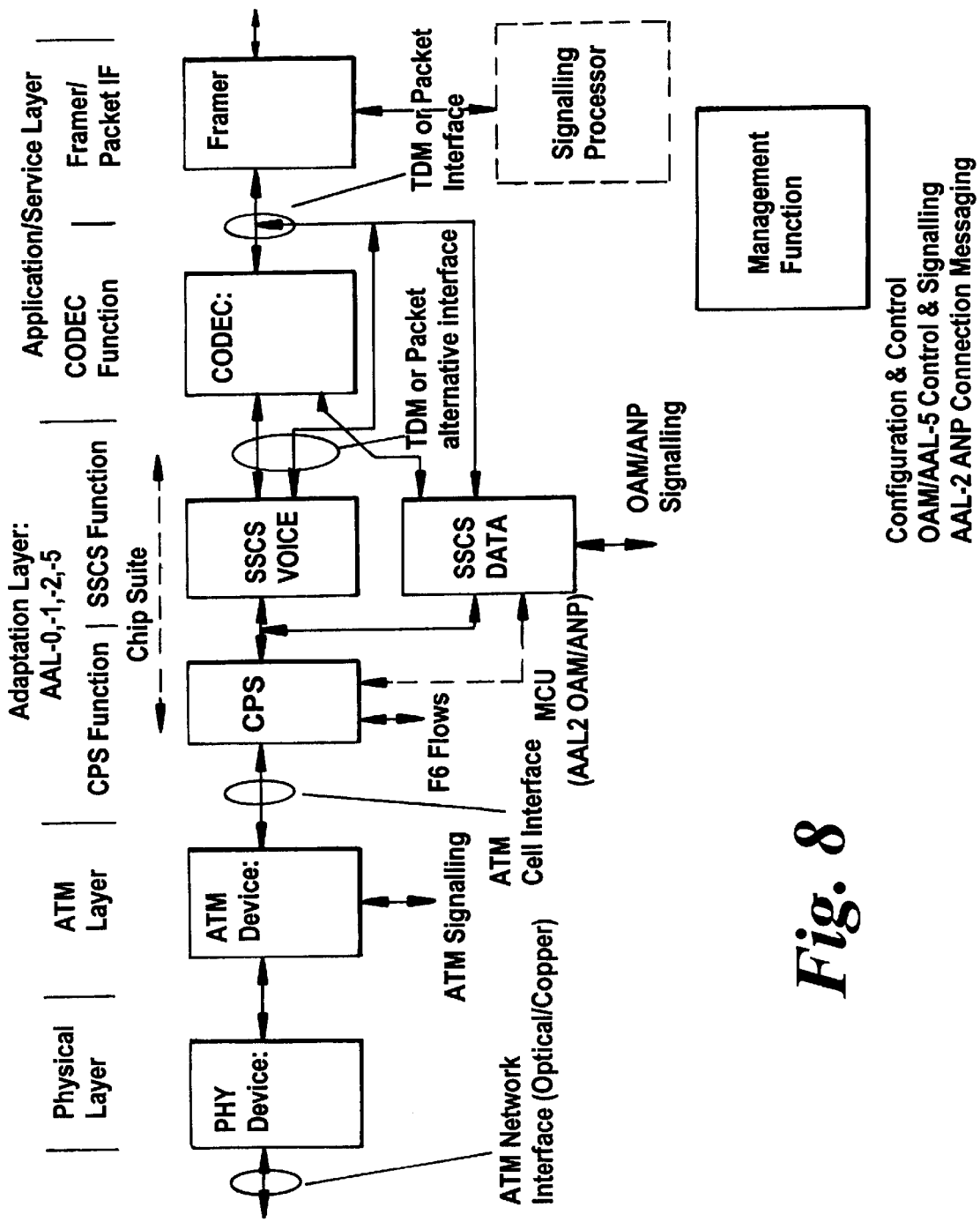
FIG. 8 illustrates an adaptation processor system for trunking/inter-working.

FIGS. 7a and 7b illustrate the main traffic buffer distributions within the chip suite when it is configured to operate in trunking/interworking mode illustrated in FIG. 8. For clarity, these figures show only the logical buffer locations and the associated key process involved in both the egress and ingress directions. The egress direction is herein referring to the direction in which the chip suite is receiving ATM Cell traffic from its standard ATM Interface; while the ingress direction is referring to the direction in which the chip suite generates ATM cell traffic towards its standard ATM interface from the TDM/packet services received.

The queue manager is an optional device whose main functions will be described below. The chip suite partitioning is designed to operate with or without this optional queue manager device, via their internal high-speed generic serial interfaces if chosen by the user. This ability ensures full scalability, performance upgradability, and cost effectiveness of the chip suite for the users depending on their connection capacity, service and adaptation network types to be supported.

Egress Traffic Direction: (Cross-Device Scheduling and Traffic shaping Strategy)

E_CPS "flow-through" to minimize delays & Inter-chip packetized Transfers for future-proof traffic handling flexibility.

In the Egress CPS function (E_CPS) all egress VC Service Data Units (SDU) received from the ATM UTOPIA interface, except for the AAL-2 VC's, are given their respective Local Channel-ID (LCID) and SDU Length (LI) information to form part of their control headers. They are transferred immediately, together with their control headers, as individual SSCS SDU packets to the terminating SSCS chips (Voice/Data) in a "flow-through" manner, i.e. minimum internal buffering delays. The E_CPS is not required to terminate the VC SDU contents except for AAL-2 VCs. While for egress AAL-2 VC SDUs, an internal AAL-2 SDU packet de-multiplex processor is activated in parallel to delineate each partial or complete CPS Packet received in an AAL-2 VC SDU. The valid partial or complete CPS SDU packets are transferred in exactly the same manner to the terminating SSCS chips as SSCS SDU packets. This is all done via the appropriate egress high-speed serial interface destined to the Egress SSCS function(E_SSCS). Alternatively a bit-parallel, flow-control capable, mini-channel UTOPIA (MCU) interface may be used to interface with an external SSCS-Data function if the SSCS-Data device is not use for full user's flexibility. This inter-chip SDU packet transfer algorithms, via the dedicated high-speed egress/ingress serial interfaces for the egress/ingress traffic direction, ensures that the egress/ingress traffic Protocol Data Units (PDU) can be in either cell, packet or even framed-mode data format as long as they are transportable in ATM Cells.

Within the destination egress SSCS device (Voice or Data), an address-agent (A) and its packet processor check and transfer the SSCS SDU packets received to their corresponding per LCID/Channel CDV/PDV buffers (depending on adaptation types) to compensate for a given CDV/PDV tolerance during the active connection periods. It is within these per LCID/Channel logical buffers the partial AAL-2 SSCS SDUs are re-assembled back into their original payload lengths (true LI) before being processed further. The buffer organisation is such that each per LCID/Channel CDV/PDV buffer is logically formed from a pseudo static "slotted" common memory architecture. Each free memory "slot" can always store up to a maximum of nx octets for a given LCID's SSCS SDU, and a free "slot" is used up and taken out from a free-list if it has stored one or more octets (less than or equal to n) for a given SSCS SDU packet. This "slotted" common memory architecture is physically formed from the external, scalable, payload memory devices (memory pools) and the internal buffer control registers (logical link-lists). Each per LCID/Channel CDV/PDV buffer is hence pseudo-static because it is logically formed by chaining a number of these static memory "slots", depending on the per LCID's CDV/PDV tolerance to be compensated for during the active connection periods, from the common memory pool. Additional CDV/PDV tolerance can be achieved by static provision more numbers of these chained free "slots" for a given LCID/Channel. The overall connection capacity of the SSCS device can simply be reduced to accommodate for these shared free "slots" changes. The user can advantageously select and provide their optimal external memory sizes, or their speed, as necessary to optimise the chip suite application for their network and service requirements. This centralised, flexible, and scalable buffering architecture may influence the user's product costs and service flexibility per user channel. It is also flexible in that the user may choose, if there is a short-term traffic/service demands in certain connections, to increase/decrease the per LCID/Channel CDV/PDV tolerances by simply re-sizing the overall egress SSCS connection capacity via the system software provisioning, i.e. without replacing the external memories.

The MAP function in egress SSCS (E_SSCS) functions as a traffic mapper/shaper to service its time-division-multiplex (TDM) or packet interface. It services the TDM interface (if selected) synchronously as a buffered SSCS SDU-to-DS-0's octet mapper and traffic shaper by playing out periodically (typically every 125 us period), the required DS-0 octets from the appropriate per LCID/Channel CDV/PDV buffers to the TDM interface. It also services the packet interface (if selected for Codec/DSP/Framer function) as the main buffered packet's mapper and scheduler by playing out the required SSCS SDUs from the appropriate per LCID/Channel CDV/PDV buffers to the packet interface. Alternatively this scheduling function can be logically distributed, in the external DSP function via the flexible packet interface as necessary.

The above pseudo memory architecture generally holds true for the egress SSCS data function (E_SSCS_Data), except that, when working with an external virtual data/message processor entity via its packet/host interface, the $E_{13}$ SSCS_Data performs the appropriate AAL-5 (per VC)/AAL-2 Type-3/4(per CID) message's segmentation and assembly (SAR) and integrity check functions as required by the service. It will not, however, terminate the message which task is a prime functional responsibility of the external virtual data/message processor. The re-assembled message protocol data unit (PDU) may be scheduled out via by the packet/host interface depending on the services and location of the data/message processor entity.

As discussed above, an optional manager device may be provided operating between the egress CPS and the terminating SSCS devices. The egress queue manager generally functions in a manner similar to that of egress SSCS in terms of common memory buffering for all egress SSCS SDU packets; except that it is a full dynamic common memory architecture instead of the slotted memory architecture for maximum buffering efficiency and can cascade multiple CPS chips for scaling via its serial interfaces. An egress traffic-shaper (TS) may be added to complement its dynamic per LCID/Channel CDV/PDV absorption and extension ability. For synchronous traffic it virtually extends the per LCID/Channel CDV/PDV tolerance capability; while for asynchronous traffic it traffic-shapes the traffic (normally with large CDV/PDV tolerance and bursty due to variable rates) to ensure no over-flows in the terminating E_SSCS buffers can occur. Within the queue manager capacity, the effective egress per LCID/Channel CDV/PDV tolerances in the terminating E_SSCSs can be considerably extended without reducing their connection capacity.

Ingress Traffic Direction:(Cross-Device Scheduling and Traffic Shaping Strategy

The ingress logical traffic buffer distribution and organisation are similar to that of egress traffic direction, except that the ingress CPS (I_CPS) now owns its centralized common buffer architecture instead of the ingress SSCS (I_SSCS_Voice). It also has an ATM cell processor (ACP) which can support per LCID/Channel Quality-of-Service (QoS) scheduling for ATM VC cell transfers.

The ATM VC SDUs are always assembled from the appropriate SSCS SDU partial packets generated in the terminating I_SSCSs. These partial SSCS SDUs are transferred to the terminating I_CPS in a similar manner as in the egress traffic direction, via the ingress serial interfaces. There is one exception that these SSCS SDUs being transferred across (from I_SSCS for trunking/interworking or E_CPS for ALS) to the I_CPS can be partial or complete parts of the original SDU payloads. The I_CPS hence has internal process to re-assemble back to their original per LCID SDUs, and also be able to identify the per LCID SDU's ingress reference ATM VC destination, adaptation types, and QoS from the SDU packet's control headers.

The I_CPS has a similar address-agent (A) and packet processor, which check and transfer the SSCS SDU packets received to similar per LCID SDU buffers already described. It is within this similar logical buffering architecture that the partial LCID SDU packets are re-assembled back into their original SDU payload lengths (true LI). Similar to the logical buffers created in the E_SSCSs, this is a pseudo static slotted memory architecture physically formed from the external, scalable, payload memory devices (memory pools) and the internal buffer control registers (logical link-list). Each free "slot" can store up to a maximum of n×octets for a LCID SDU. A free SDU "slot" is used up and taken out from a free-list if it has stored one or more payload octets (less than or equal to n) for a given LCID SDU packet. The ATM cell processor (ACP), except for AAL-2 VC SDU generations, functions as a per VC SDU multiplexer by which the per LCID SDUs will be scheduled out from their SDU buffers, according to the respective QoS provisioned, for ATM VC SDU generation and finally transference. Exclusively for the AAL-2 VC SDU generations, the ACP also supports a parallel algorithm by which the AAL-2 CPS packets (Header+SDU) destined to the same AAL-2 VC are logically linked and multiplexed to form the ATM VC's SDUs. This process is fully compliance to the latest ITU-T. I.363.2 Standard requirements. With this common memory architecture in the I_CPS the user has a total freedom, within the Chip Suite design capacity, of deciding their requirements of parallel ATM adaptation processing (i.e. for AAL-0, -1, -2 and -5), and hence the required external memory size, that are to be supported for their service/network applications.

The MCU interface in the I_CPS supports flow-control for its ingress packet traffic from the SSCS-Data function, if selected. This ensures that the SAR buffering function stays within the SSCS-Data function for message based ingress traffic and hence the I_CPS's buffer associated with the ingress MCU interface can remain at a minimum.

Unlike its SSCS Voice counterpart, the I_SSCS Data has a similar common buffering architecture due it is now needed to support some of the segmentation and reassembly (SAR) functions for AAL-5/Type-3/4(AAL-2) messages.

An ingress traffic-shaper (TS) is required such that even for messages with very large instantaneous PDVs due to their variable data rate nature, it traffic-shapes to maintain an effective per LCID SDU packet throughput that will not over-flow the common buffers in the terminating I_CPS, or I_Queue Manager if used. This has the advantage of reducing the complexity, and hence the costs, of the distributed common buffer architecture between the CPS, SSCS and queue manager chips.

Buffer Distributions in AAL-2 Switching Mode.

Figure 9A:
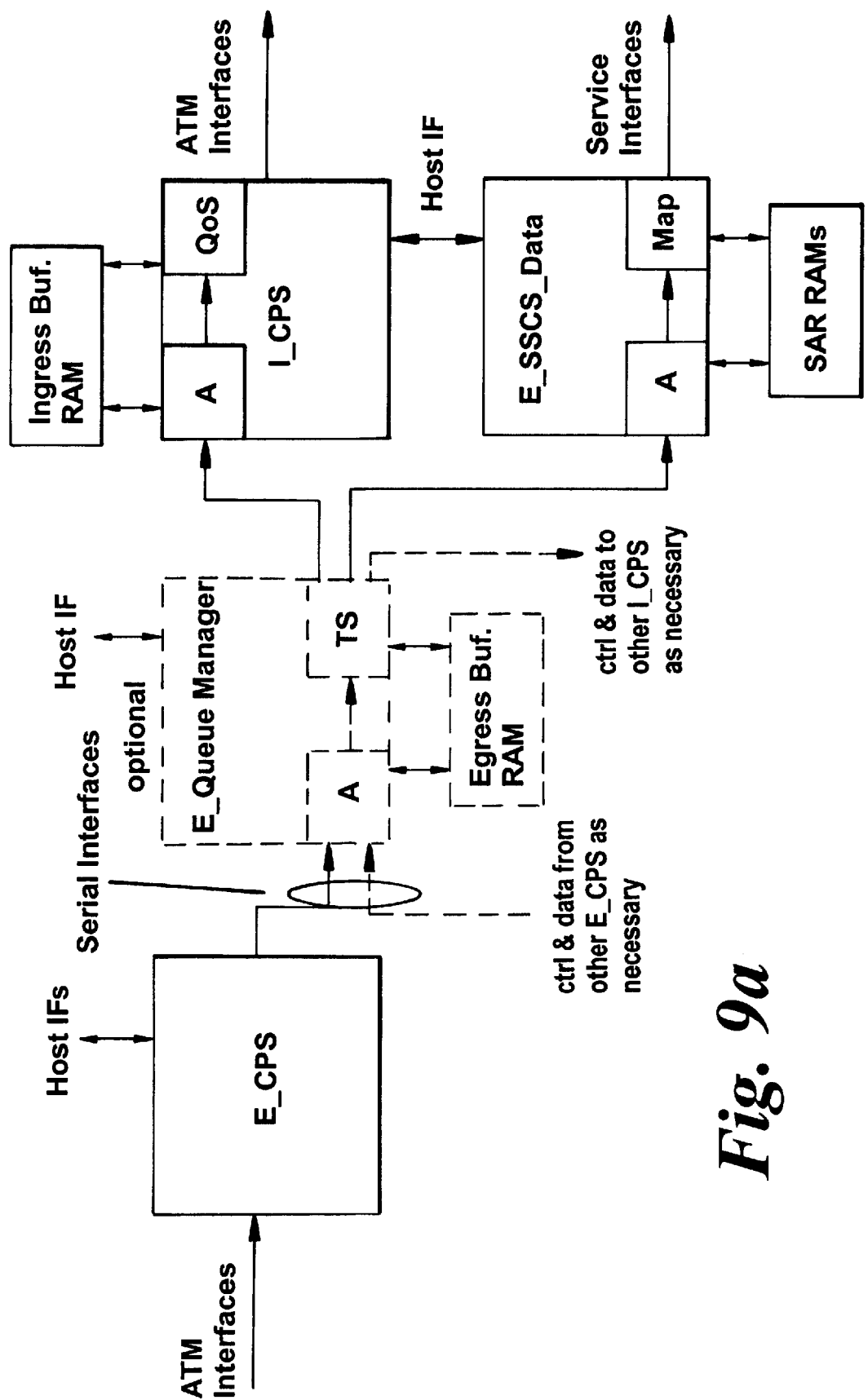
FIGS. 9a and 9b illustrate traffic buffer distribution in AAL2 switching mode for egress and ingress traffic respectively.
Figure 9B:
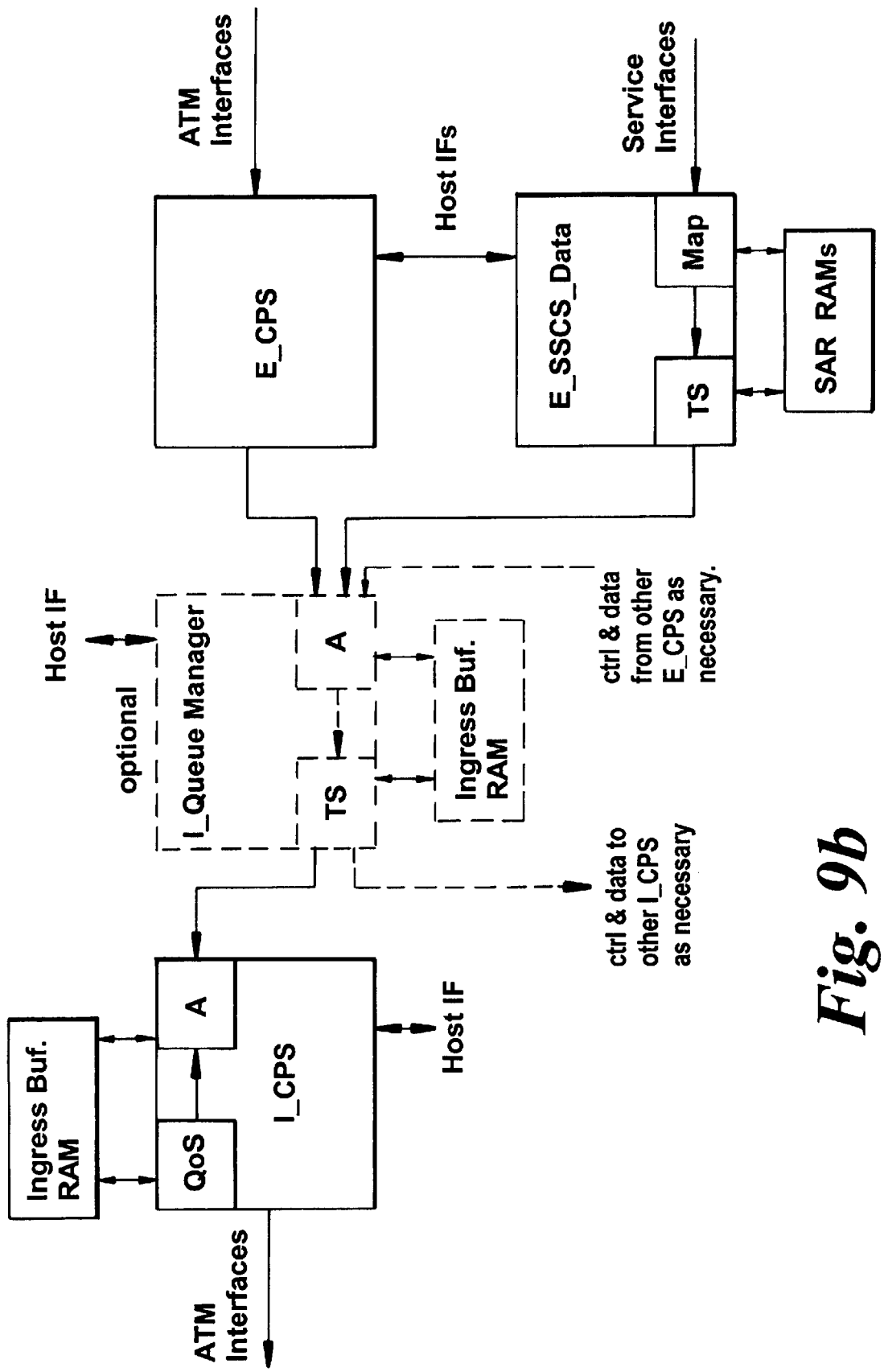
Figure 10:
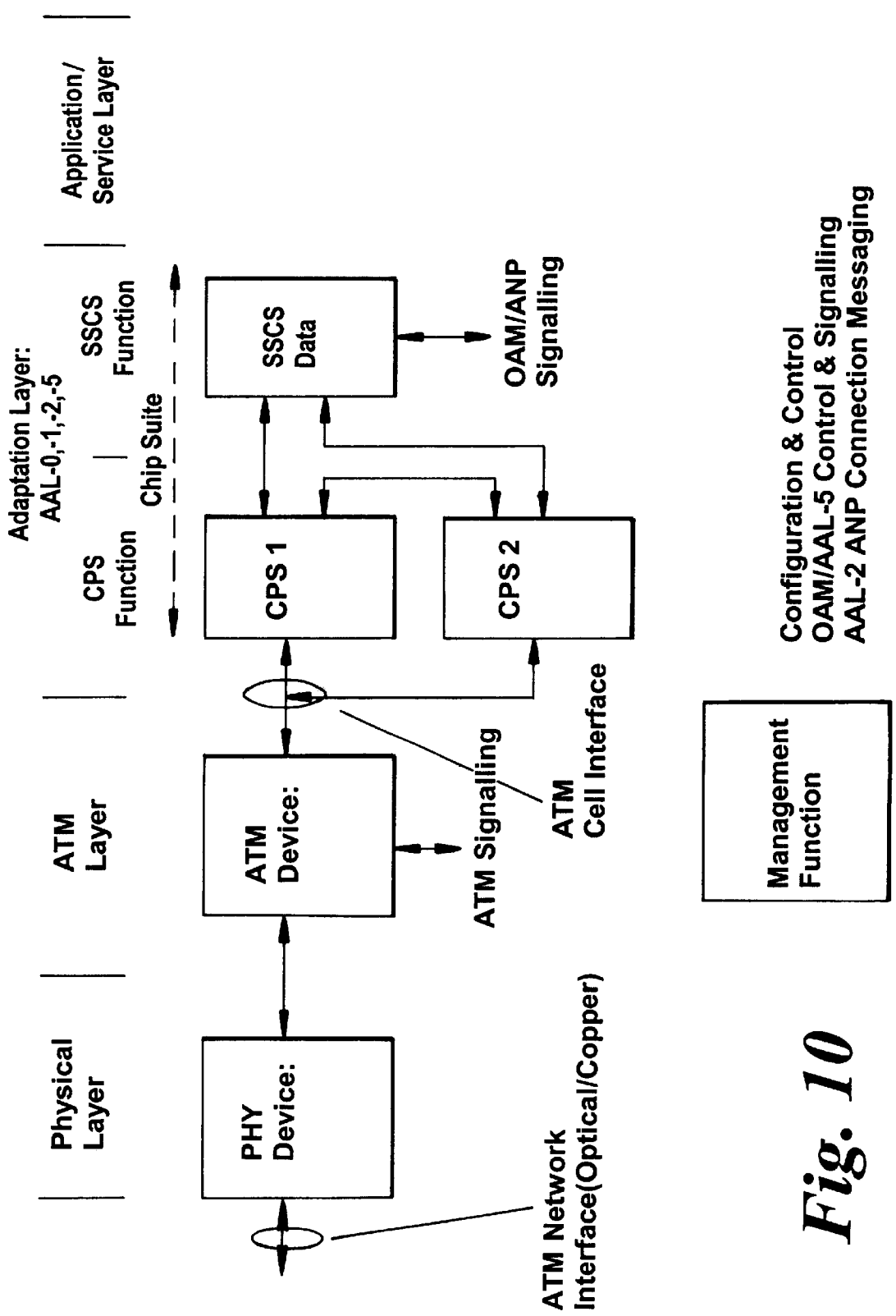
FIG. 10 illustrates an adaptation processor system for AAL-2 switching.

FIG. 9a and 9b illustrate the logical main traffic buffer distributions within the chip suite architecture when it is configured to operate in AAL-2 switching mode, illustrated schematically in FIG. 10. For clarity, the figure only shows the logical buffer locations and its associated key process involved in both the egress and ingress directions. The buffer distribution and architecture correspond to the ingress CPS buffer architecture already described above. Note that only the SSCS_Data device, which is served to support limited SAR of AAL-2 Type-3/4 (or AAL 5) connection management messages, is used and no SSCS_Voice devices are needed. The optional queue manager device can still be used to extend the per LCID CDV/PDV compensation, and to allow cascading of multiple CPS chips for scaling up the overall connection capacity as necessary.

It will be understood that the above description of a preferred embodiment is given by way of example only and that various modifications may be made by those skilled in the art without departing from the spirit and scope of the invention.

What is claimed is:

1. An asynchronous transfer mode adaptation processor comprising a set or suite of integrated circuit devices and being partitioned by AAL functions into a first device or device set arranged to perform a common part sublayer function and a second device or device set arranged to perform service specific sublayer functions.

2. An interface arrangement for providing interworking between packet (IP), time division multiplex (TDM) and asynchronous (ATM) networks, the interface comprising TDM framing means providing an interface to the TDM network, packet framing means providing an interface to the packet network, and ATM adaptation means providing an interface to the ATM network, wherein said ATM adaptation means comprises a set or suite of integrated circuit devices and being partitioned by AAL functions into a first device or device set arranged to perform a common part sublayer function and a second device or device set arranged to perform service specific sublayer functions.

3. An interface arrangement as claimed in claim 2, and incorporating a digital signal processor CODEC coupled to said TDM framing means, said packet framing means and said ATM adaptation means whereby to provide an interconnection therebetween.

4. An interface arrangement as claimed in claim 3, wherein said ATM adaptation interface is partitioned into is partitioned into a common part sublayer (CPS) device 111, a voice service specific convergence sublayer device (SSCS-V) 113, and an optional data service specific convergence sublayer device (SSCS-D).

5. An interface arrangement as claimed in claim 4, wherein the service specific sublayer function comprises a first group of voice service specific convergence sublayer devices and a second group of data service specific convergence sublayer devices the relative numbers of the devices forming said first and second groups being determined by the user's service needs and the type of service adaptation equipment.

6. An interface arrangement as claimed in claim 5, and incorporating a traffic queue manager.

7. An interface arrangement as claimed in claim 6, wherein said queue manager comprises an ingress queue manager and an egress queue manager.

8. An interface arrangement as claimed in claim 7, and incorporating means for performing dynamic intermediate VC connection management.

9. An interface arrangement for inter-working of traffic between a first TDM network, a second Internet Protocol (IP) network, and an ATM network, the interface comprising;

a TDM framing circuit providing an interface to the TDM network;

an IP packet framing circuit providing an interface to the IP network;

an ATM adaptation processor providing an interface to the ATM network; and a codec providing a coupling between the TDM framing circuit, the IP packet framing circuit and the ATM adaptation processor;

wherein the interface arrangement is such that such that data traffic is passed , directly between the TDM framing circuit, the adaptation processor and the IP framing circuit, and voice traffic is passed indirectly between the TDM framing circuit, the adaptation processor and the IP framing circuit via the codec.

10. An interface arrangement as claimed in claim 9, wherein said ATM adaptation interface is partitioned into is partitioned into a common part sublayer (CPS) device 111, a voice service specific convergence sublayer device (SSCS-V) 113, and an optional data service specific convergence sublayer device (SSCS-D).

11. An interface arrangement as claimed in claim 10, wherein the service specific sublayer function comprises a first group of voice service specific convergence sublayer devices and a second group of data service specific convergence sublayer devices the relative numbers of the devices forming said first and second groups being determined by the user's service needs and the type of service adaptation equipment.

12. A method of providing interworking between packet (IP), time division multiplex (TDM) and asynchronous (ATM) networks via an interface comprising TDM framing means providing an interface to the TDM network, packet framing means providing an interface to the packet network, and ATM adaptation means providing an interface to the ATM network, wherein said method comprises partitioning said adaptation means by AAL functions into a first device or device set arranged to perform a common part sublayer function and a second device or device set arranged to perform service specific sublayer functions.

* * * * *